J. HILLS.
COMPRESSION FAUCET.
No. 182,439. Patented Sept. 19, 1876.
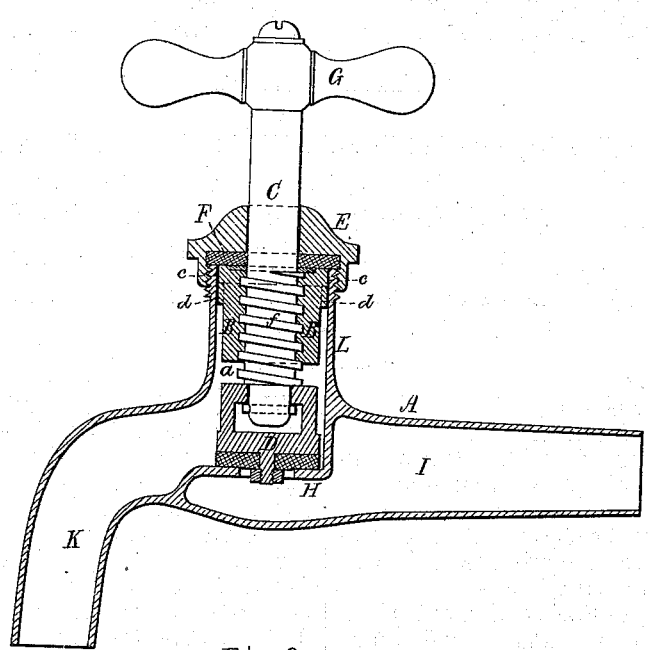
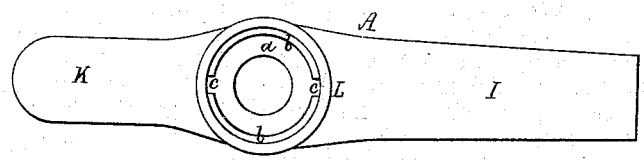
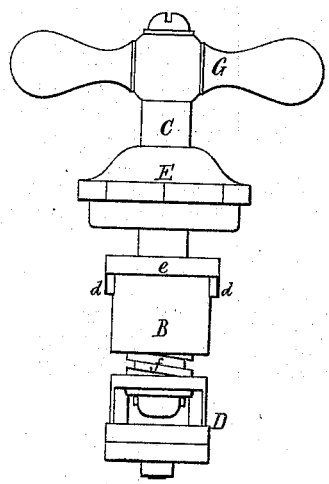
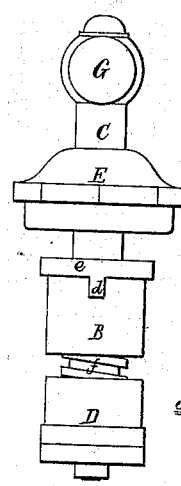
Witnesses.
S. W. Piper
L. W. Miller
Jacob Hills
by his attorney.
R. H. Eddy

UNITED STATES PATENT OFFICE.

JACOB HILLS, OF HAYDENSVILLE, MASSACHUSETTS.

IMPROVEMENT IN COMPRESSION-FAUCETS.

Specification forming part of Letters Patent No. 182,439, dated September 19, 1876; application filed August 25, 1876.

*To all whom it may concern:*

Be it known that I, JACOB HILLS, of Haydensville, of the county of Hampshire and State of Massachusetts, have invented an Improved Compression-Faucet; and do hereby declare the same to be described in the following specification, and represented in the accompanying drawings, of which—

Figure 1 is a longitudinal section of it; Fig. 2, a top view of its body; Figs. 3 and 4, side view of the valve, screw-shank, rotary nut, and cap, as removed from the said body.

In this faucet the body A is furnished with a valve-chamber, *a*, open at top, and there provided with an interior flange, *b*, having one or more notches, *c*, in or through it transversely, to receive one or more ears, *d*, extending from a cylindrical screw-nut, B, and down from a flange, *e*, arranged at the upper part of such nut, as shown.

When the nut is in place within the valve-chamber, the flange *e* rests directly upon the upper edge of the notched flange *b*, and each ear or projection *d* enters one of the notches *c*, the top of the nut being flush with that of the valve-chamber.

The valve-shank C, provided with a male screw, *f*, to engage with the female screw of the nut, has both the valve D and the cap E of the valve-chamber applied to it in manner so as to be capable of being freely revolved on it, (the said shank,) the valve being so fixed to it as to be moved endwise by and with it, while it (the said shank) may be so moving.

The cap E screws upon the valve-case L, and contains an elastic washer, F, which, when compressed by the cap, makes a water-tight joint around the valve shank or stem, and at the head of the valve-case.

The nut is supported in the valve-case by the flanges *b* and *e*, and is prevented by the ears and notches from revolving therein. The perforated valve-seat is shown at H, the induct at I, and the educt at K. The compression-faucet so made, like others, is provided with a handle, G, and is very simple in construction and effective in operation.

I claim in the described faucet—

1. The screw-nut B, provided with the flange *e* and one or more ears, *d*, in combination with the valve-case, having the notched flange *b*, all being substantially as set forth.

2. The improved faucet, constructed substantially as described, viz., with its body provided with the valve chamber and seat, the induct and educt, and the notched flange, as set forth, and with its valve-stem furnished with the screw cap and the valve to revolve thereon, and with the screw-nut having the supporting-flange and one or more ears, all being applied and arranged essentially as shown and explained.

JACOB HILLS.

Witnesses:
C. HILLS,
J. E. HILLMAN.